(12) United States Patent
Marten-Perolino et al.

(10) Patent No.: US 7,662,058 B2
(45) Date of Patent: Feb. 16, 2010

(54) BULL-WHEEL IN SEVERAL PARTS ABLE TO BE REASSEMBLED ON SITE FOR A ROPE TRANSPORT INSTALLATION

(75) Inventors: Matteo Marten-Perolino, Grenoble (FR); Franckie Tamisier, Saint Nazaire les Eymes (FR)

(73) Assignee: Pomagalski S.A., Fontaine (FR)

( * ) Notice: Subject to any disclaimer, the term of this patent is extended or adjusted under 35 U.S.C. 154(b) by 745 days.

(21) Appl. No.: 11/033,173

(22) Filed: Jan. 12, 2005

(65) Prior Publication Data
US 2005/0192146 A1 Sep. 1, 2005

(30) Foreign Application Priority Data
Feb. 27, 2004 (FR) .................................. 04 02042

(51) Int. Cl.
*F16H 55/36* (2006.01)
(52) U.S. Cl. ................ 474/174; 474/176; 474/166; 474/195
(58) Field of Classification Search ................ 474/176, 474/174, 166, 195
See application file for complete search history.

(56) References Cited
U.S. PATENT DOCUMENTS

| 1,331,173 | A | | 2/1920 | Webb |
| 1,334,688 | A | * | 3/1920 | Woodworth ................ 474/170 |
| 1,477,237 | A | * | 12/1923 | Bloss ........................ 474/122 |
| 1,548,335 | A | * | 8/1925 | Selser ........................ 474/170 |
| 1,610,588 | A | * | 12/1926 | Rawson ..................... 474/170 |
| 1,694,274 | A | * | 12/1928 | McKean ..................... 474/130 |
| 1,694,350 | A | * | 12/1928 | Bloss ........................ 474/170 |
| 1,959,570 | A | * | 5/1934 | Chevalier .................. 474/195 |
| 2,730,906 | A | | 1/1956 | Dickerson |
| 3,857,340 | A | * | 12/1974 | Wright .................... 104/173.2 |
| 4,193,311 | A | | 3/1980 | Rinio et al. |
| 2003/0040386 | A1 | * | 2/2003 | Yamasaki .................. 474/151 |

FOREIGN PATENT DOCUMENTS

| EP | 1 099 880 A1 | 5/2001 |
| GB | 140720 | 4/1920 |

* cited by examiner

*Primary Examiner*—Robert A Siconolfi
*Assistant Examiner*—James K Hsiao
(74) *Attorney, Agent, or Firm*—Oliff & Berridge, PLC

(57) ABSTRACT

A bull-wheel for a rope transport installation comprises a hub and a peripheral rim joined to the hub by a metal connecting framework composed of a perforated central disk strengthened by rigidifying arms. The rim is radially subdivided into several circular segments assembled to one another by first fixing members. The hub is fixedly secured to a support enclosure comprising at least one coaxial plate of polygonal cross-section confining at the ends bearing surfaces for the central disk and the radial rigidifying arms assembled by second fixing members. The assembly is arranged so as to distribute the radial forces in the axis of the rope uniformly regardless of the angular position of the bull-wheel when the latter is driven in rotation.

9 Claims, 5 Drawing Sheets

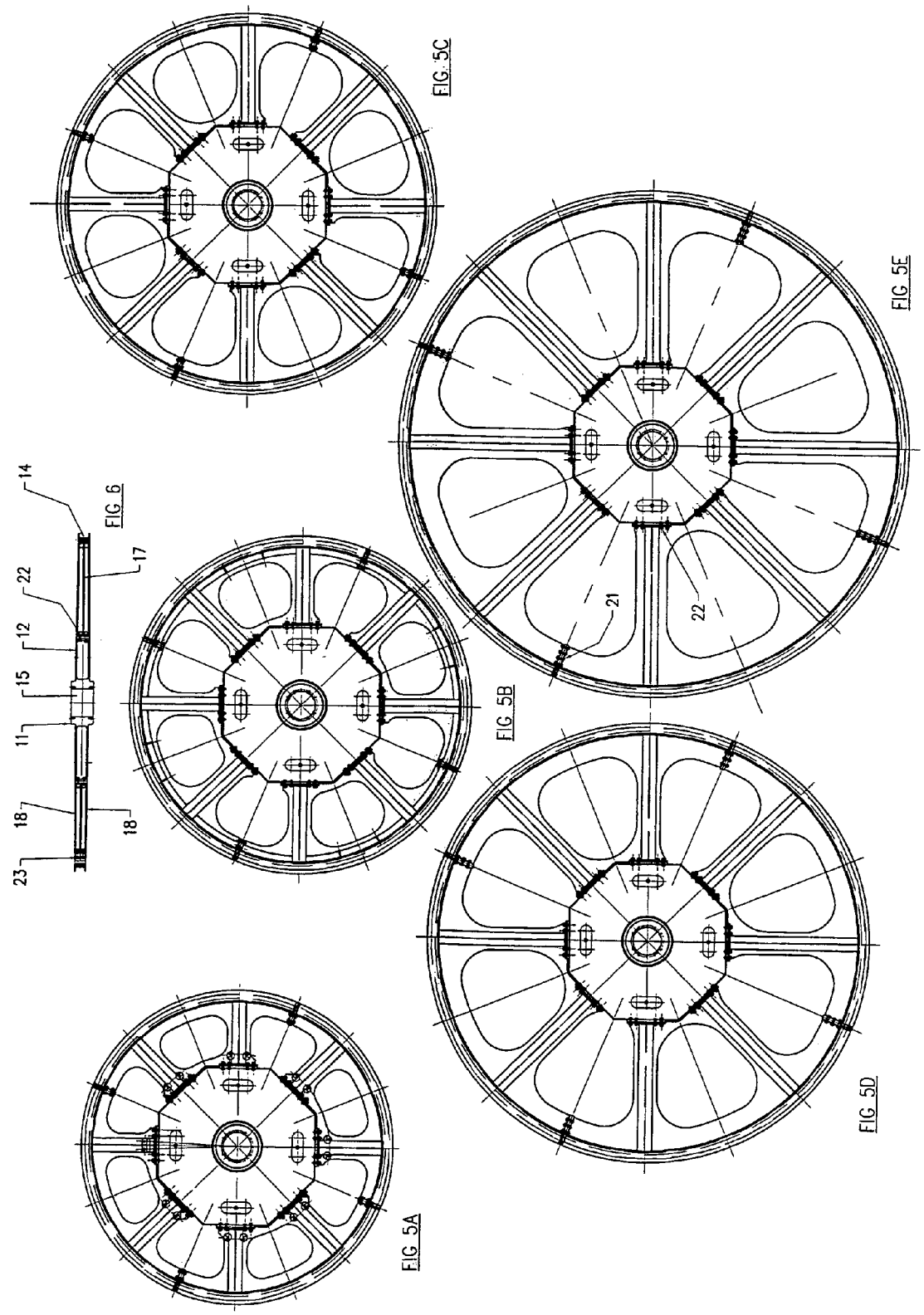

BULL-WHEEL IN SEVERAL PARTS ABLE TO BE REASSEMBLED ON SITE FOR A ROPE TRANSPORT INSTALLATION

BACKGROUND OF THE INVENTION

The invention relates to a bull-wheel for a rope transport installation, comprising:
a hub of circular cross-section for passage of a shaft,
a peripheral rim with an annular groove for housing the rope, said rim being joined to the hub by a metal connecting framework composed of a perforated central disk strengthened by rigidifying arms,
and fixing members to assemble different elemental parts of the framework and of the rim to one another.

STATE OF THE ART

The document EP 1,099,880 refers to a bull-wheel of the kind mentioned wherein the two lines dividing the different parts extend along secants parallel to one another and arranged radially on each side of the hub. Such a divided structure of the bull-wheel causes a variation of the mechanical resistance, when rotation takes place, depending on the angular position of the rim with respect to the axis of the hub. The fixing members have to withstand high shearing forces.

OBJECT OF THE INVENTION

The object of the invention is to achieve a bull-wheel subdivided into several parts able to reassembled on site, and being provided with a high mechanical resistance for driving a rope transport installation.

The device according to the invention is characterized in that the rim is radially subdivided into several circular segments assembled to one another by first fixing members, and that the hub is fixedly secured to a support enclosure comprising at least one plate of polygonal cross-section confining at the ends thereof bearing surfaces for the central disk and the radial rigidifying arms assembled by second fixing members. The assembly contributes to distributing the radial forces uniformly regardless of the angular position of the bull-wheel with respect to the rope.

According to a preferred embodiment, the rim is subdivided into at least four peripheral segments joined to the central disk by connecting flanges receiving the first fixing members. The support enclosure is formed by two coaxial plates forming a central housing of regular polygonal shape co-operating in the mid-plane of the axis of the rope with the disk of the framework for uniform distribution of the forces.

The bull-wheel is subdivided into five elemental parts comprising, in addition to the standard module, four quarter-rim segments each equipped with two pairs of rigidifying arms and with a disk sector.

Other features can be used either alone or in combination:
the support enclosure comprises an octagonal periphery defining eight bearing surfaces designed to receive the second fixing members of the connecting framework;
the hub is welded to the support enclosure to constitute an undividable standard module;
the support enclosure comprises a single plate arranged in the mid-plane of the axis of the rope with the disk of the framework.

BRIEF DESCRIPTION OF THE DRAWINGS

Other advantages and features will become more clearly apparent from the following description of an embodiment of the invention, given as a non-restrictive example only and represented in the accompanying drawings in which:
FIGS. 5A to 5E are elevations of a range of bull-wheels of different diameters equipped with the same central module of the hub and support enclosure;
FIG. 6 represents a side view of FIG. 5B.

DESCRIPTION OF A PREFERRED EMBODIMENT

Figure 1:
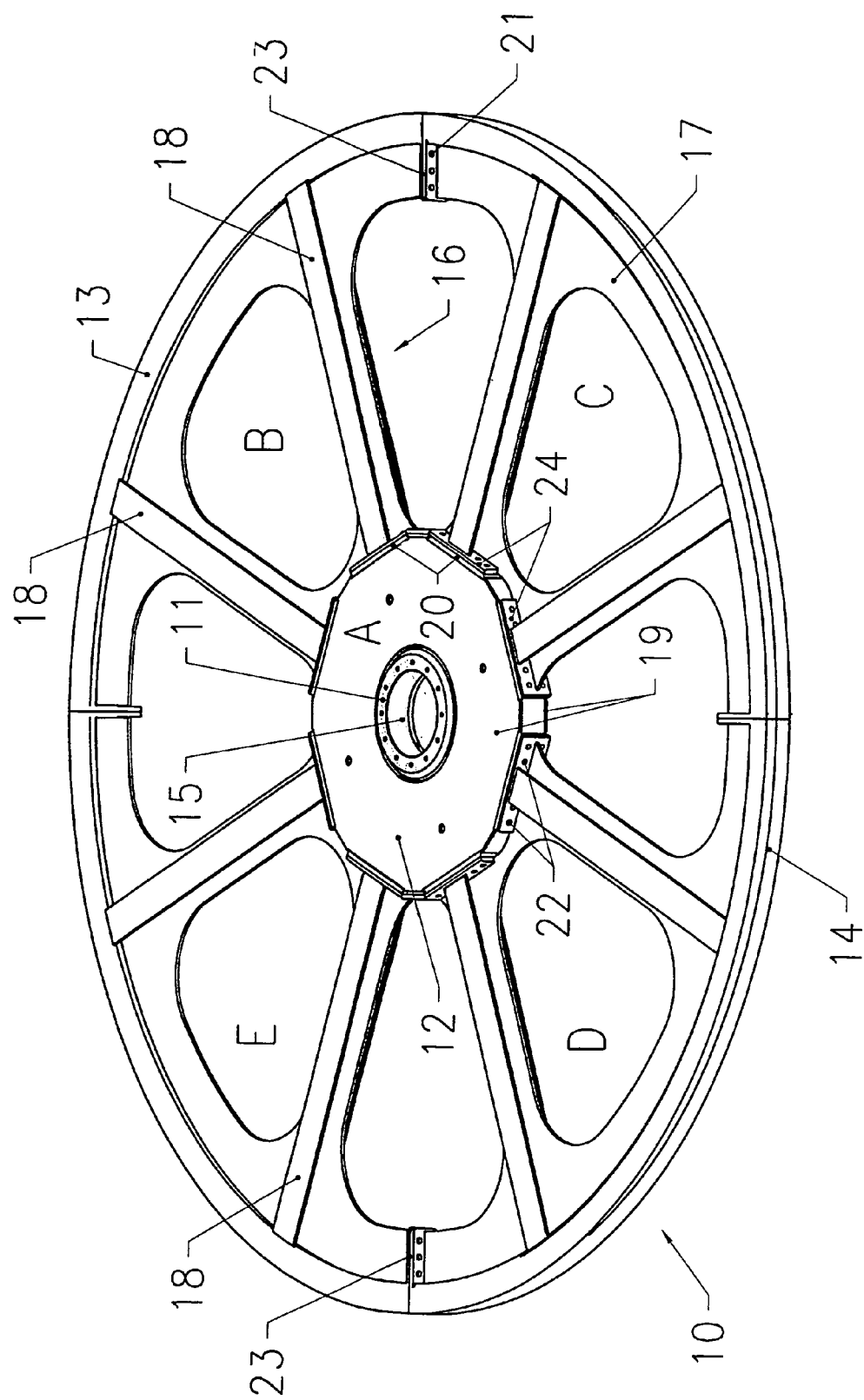
FIG. 1 is a perspective view of the bull-wheel according to the invention after final assembly of the different parts of its structure.
Figure 2:
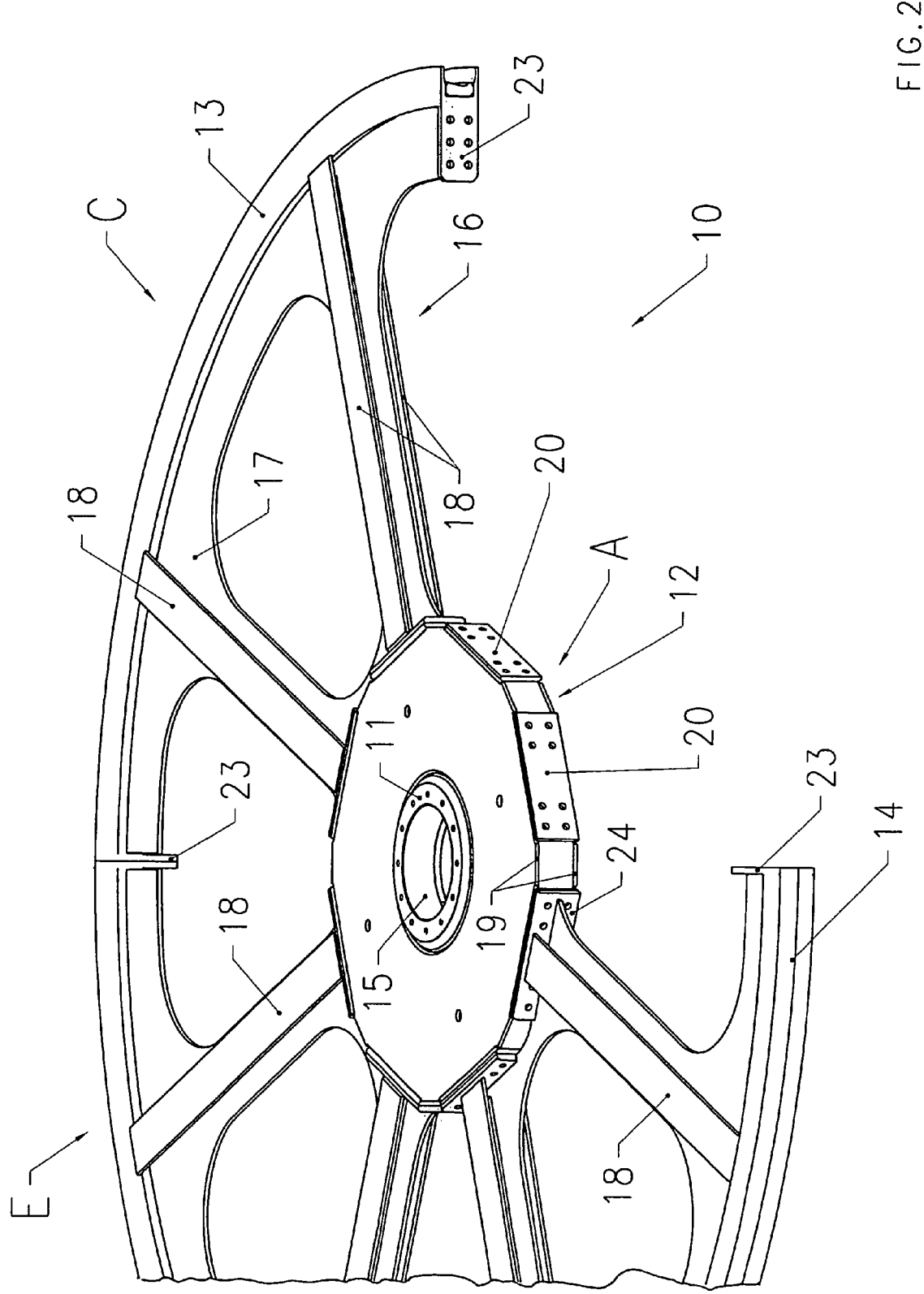
FIGS. 2 to 4 show partial views of FIG. 1.
Figure 3:
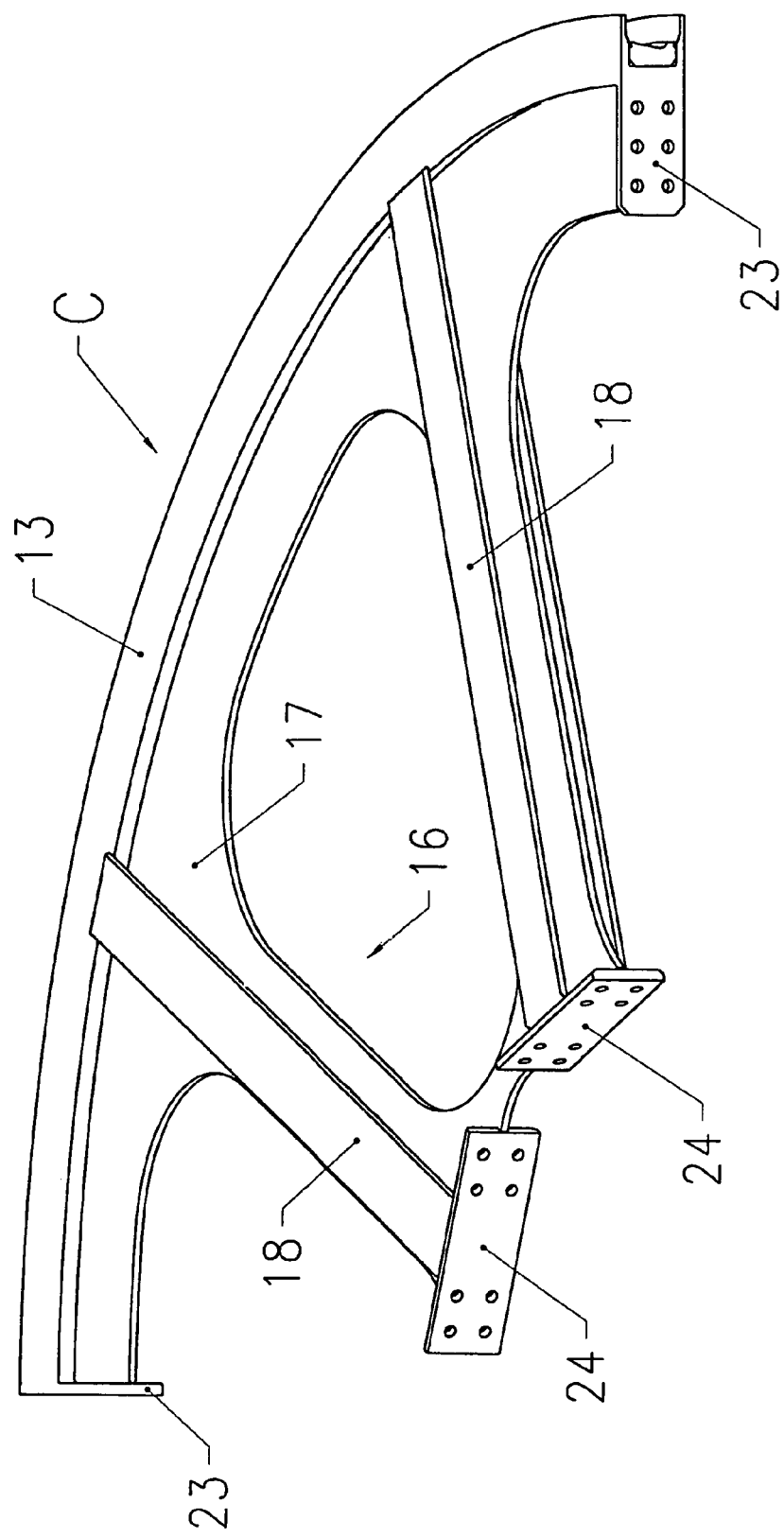
Figure 4:
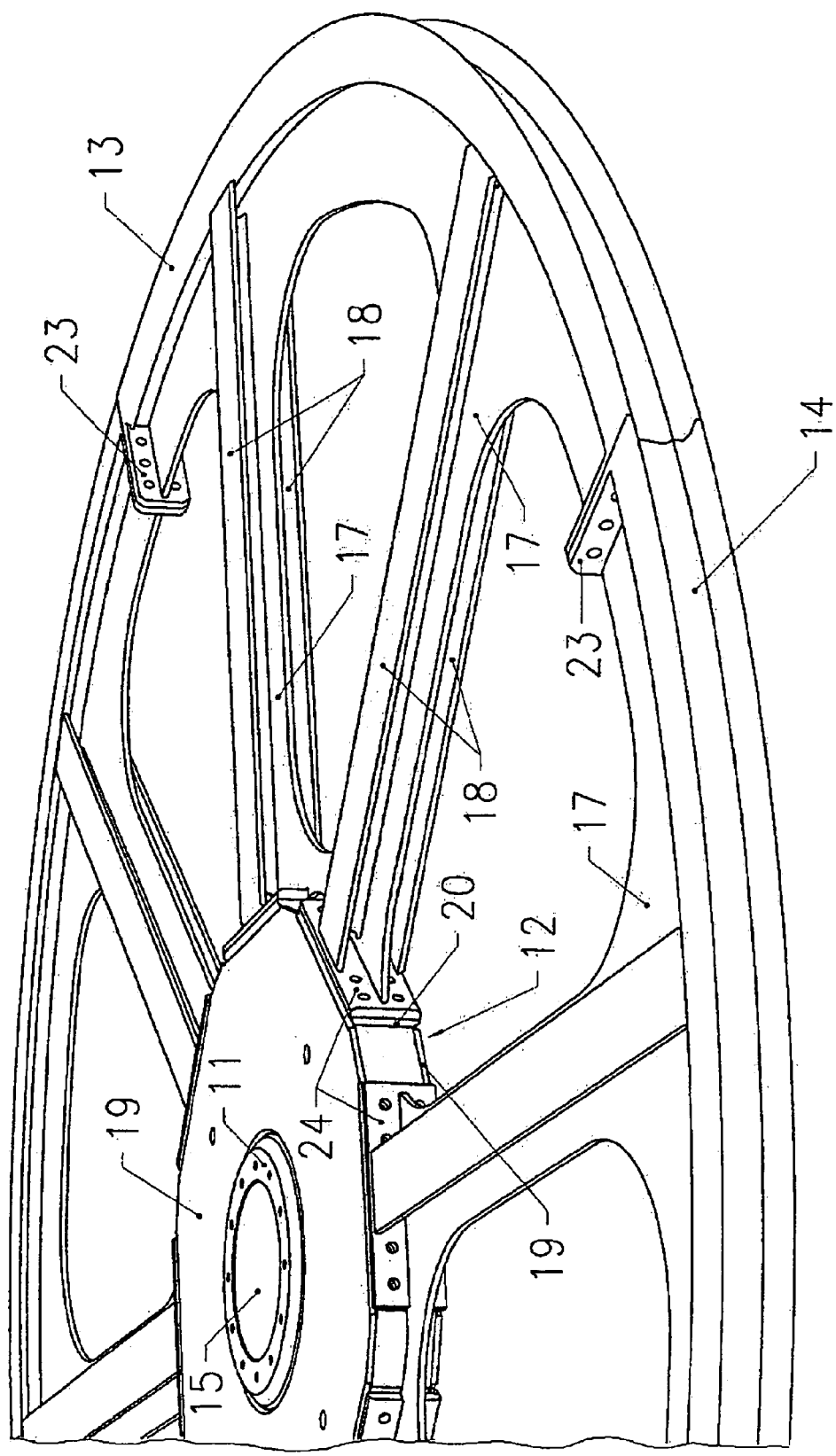

With reference to the figures, a bull-wheel 10 for a transport installation by rope, in particular a chair-lift or cable-car, is subdivided into several parts A-E able to be disassembled for transport and reassembled on site.

The bull-wheel 10 can be a terminal bull-wheel (drive or tensioning bull-wheel) or a return bull-wheel.

The bull-wheel 10 comprises a circular hub 11 fixed in a central support enclosure 12 and a peripheral rim 13 equipped with an annular groove 14 for accommodating the transport installation rope.

The hub 11 is formed by a monoblock body having an internal bore of circular cross-section for passage of the rotary shaft of the drive motor unit. The body of the hub 11 is secured by welding to the support case 12, the assembly constituting an undividable standard module.

The rim 13 is joined to the hub 11 by a metal connecting framework 16 composed of a perforated central disk 17 strengthened by rigidifying arms 18 extending in the form of a star in radial directions. The rim 13 is radially subdivided into several joined circular segments assembled to one another and to the disk 17 by flanges 23, first fixing members 21 passing through said flanges. The flanges 23 extend radially with angular offsets of 90° in four connecting zones of the rim segments and of the disk 17.

The support enclosure 12 comprises a pair of coaxial plates 19 of polygonal cross-sections defining on the periphery thereof bearing surfaces 20 for the central disk 17 and radial rigidifying arms 18. The arms 18 are arranged in parallel manner on each side of the disk 17 and are formed by H-shaped sections provided at the ends thereof with assembly pads 24 that are secured to the bearing surfaces 20 by second fixing members 22. The first and second fixing members 21, 22 are formed by nuts and bolts or equivalent assembly means.

For example, the connecting framework 16 comprises eight pairs of rigidifying arms 18 associated to the central disk 17, and the rim 13 is subdivided into four segments. In this case, the support enclosure 12 comprises an octagonal periphery and the bull-wheel 10 is formed by five reassemblable parts A, B, C, D, E comprising:
the undividable standard module of the assembly formed by the hub 11 and support enclosure 12 constituting the part A;
four quarter-rim segments each equipped with two pairs of arms 18 and with a disk sector, constituting the identical parts B-E.

It is clear that a different number of arms 18 can be used depending on the number of sides of the regular polygon of the support enclosure 12.

Most of the forces exerted by the tension of the rope on the bull-wheel 10 are taken up by the central disk 17 arranged in the axis of the rope and in the mid-plane of symmetry of the plates 19 of the support enclosure 12. The set of rigidifying arms 18 also absorb a lesser fraction of the forces. The connecting framework 16 contributes to distributing the radial forces uniformly over the polygonal support enclosure 12 regardless of the angular position of the bull-wheel. This results in an optimum mechanical resistance after assembly of the parts A-E and fitting of the first and second fixing members 21, 22.

In FIGS. 5A to 5E, a range of five bull-wheels 10 according to the invention shows that the assembly formed by the hub 11 and support enclosure 12 constitutes a single standard module regardless of the external diameter of the bull-wheel. The radius of the arms 18 and the dimensions of the segments of rim 13 and of the disk 17 simply have to be changed.

The standard central module of the part A can advantageously be pre-mounted in the plant on the framework of the terminal station, which makes fitting of the other four parts B-E of the bull-wheel 10 on site easier. For transport of the bull-wheel 10 from the plant, the four detached parts of the framework 16 and of the rim 13 simply have to be transported separately to site, which reduces freight costs.

The number of bull-wheels of the range can naturally be any number depending on the diameters chosen.

Instead of providing a central housing with two coaxial plates 19, it is also possible to use a single plate 19 arranged in the mid-plane of the axis of the rope with the disk 17 of the framework 16.

The invention claimed is:

1. Bull-wheel for a rope transport installation, comprising:
a hub of circular cross-section for passage of a shaft,
a peripheral rim with an annular groove for housing the rope, the rim being joined to a support enclosure by a metal connecting framework comprised of a perforated central disk extending between the rim and the support enclosure strengthened by radial rigidifying arms,
and fixing members to assemble different elemental parts of the framework and of the rim to one another,
wherein:
the rim is radially subdivided into several arced segments assembled to one another by first fixing members passing through radial flanges of the arced segments,
the hub is fixedly secured to the support enclosure,
the support enclosure comprises at least one plate provided with at least one polygonal surface and a periphery defining a plurality of bearing surfaces,
the bearing surfaces confine the polygonal surface and are perpendicular to the polygonal surface,
the perforated central disk and the radial rigidifying arms are assembled on the bearing surfaces by second fixing members, and
the bull-wheel distributes radial forces uniformly regardless of the angular position of the bull-wheel with respect to the rope.

2. Bull-wheel according to claim 1, wherein the support enclosure comprises a pair of coaxial plates forming a central housing.

3. Bull-wheel according to claim 1, wherein the support enclosure comprises a plate arranged in the mid-plane of the axis of the rope with the disk of the framework.

4. Bull-wheel according to claim 2, wherein the support enclosure is of regular polygonal shape co-operating in the mid-plane of the axis of the rope with the disk of the framework for uniform distribution of the forces.

5. Bull-wheel according to claim 4, wherein the support enclosure comprises an octagonal periphery defining eight bearing surfaces designed to receive the second fixing members of the connecting framework.

6. Bull-wheel according to claim 1, wherein the rigidifying arms are arranged in the form of a star at regular angular intervals on each side of the disk and are formed by metal sections equipped at their ends with assembly pads fixed to the bearing surfaces of the support enclosure by the second fixing members.

7. Bull-wheel according to claim 1, wherein the hub is welded to the support enclosure to constitute an undividable standard module.

8. Bull-wheel according to claim 7, wherein the bull-wheel is subdivided into five elemental parts comprising, in addition to the standard module, four identical quarter-rim segments each equipped with two pairs of rigidifying arms and with a disk sector.

9. Bull-wheel according to claim 1, wherein the rim is subdivided into n peripheral segments joined to the central disk by connecting flanges receiving the first fixing members.

* * * * *